US008009808B2

(12) United States Patent
Montoya

(10) Patent No.: US 8,009,808 B2
(45) Date of Patent: Aug. 30, 2011

(54) SYSTEM AND METHOD FOR MAINTAINING A TRANSLATIONS DATABASE TO EFFECT CALL CONTROL AT A REMOTE TERMINAL

(75) Inventor: Alex Montoya, Westminster, CO (US)

(73) Assignee: Intrado Inc., Longmont, CO (US)

( * ) Notice: Subject to any disclaimer, the term of this patent is extended or adjusted under 35 U.S.C. 154(b) by 1300 days.

(21) Appl. No.: 11/538,861

(22) Filed: Oct. 5, 2006

(65) Prior Publication Data
US 2007/0121801 A1 May 31, 2007

Related U.S. Application Data

(60) Provisional application No. 60/723,885, filed on Oct. 5, 2005.

(51) Int. Cl.
H04M 3/22 (2006.01)
H04M 7/00 (2006.01)

(52) U.S. Cl. .......... 379/9.02; 379/15.01; 379/32.04; 379/219

(58) Field of Classification Search .......... 379/9, 9.02, 379/15.01, 32.01, 32.04, 219, 220.01
See application file for complete search history.

(56) References Cited

U.S. PATENT DOCUMENTS

| | | | |
|---|---|---|---|
| 4,251,880 A | 2/1981 | Baugh et al. | |
| 5,323,444 A | 6/1994 | Ertz et al. | |
| 5,379,337 A | 1/1995 | Castillo et al. | |
| 5,418,776 A | 5/1995 | Purkey et al. | |
| 5,907,537 A * | 5/1999 | Papineau et al. | 370/254 |
| 6,229,886 B1 | 5/2001 | Moody et al. | |
| 6,252,943 B1 | 6/2001 | Johnson et al. | |
| 6,366,662 B1 | 4/2002 | Giordano et al. | |
| 6,493,337 B1 | 12/2002 | Stevenson | |
| 6,721,395 B2 | 4/2004 | Martinez | |
| 6,993,118 B2 | 1/2006 | Antonucci et al. | |
| 7,068,641 B1 * | 6/2006 | Allan et al. | 370/352 |
| 7,319,747 B2 | 1/2008 | Smith | |
| 7,440,442 B2 | 10/2008 | Grabelsky et al. | |
| 7,680,252 B2 * | 3/2010 | Elder | 379/37 |
| 7,756,254 B1 | 7/2010 | Croak et al. | |
| 2003/0108177 A1 * | 6/2003 | Hsieh et al. | 379/219 |
| 2004/0136520 A1 | 7/2004 | Ehreth et al. | |
| 2006/0067485 A1 | 3/2006 | Beason et al. | |
| 2006/0098791 A1 | 5/2006 | Elder | |
| 2007/0003024 A1 | 1/2007 | Olivier et al. | |
| 2007/0071182 A1 * | 3/2007 | Elder et al. | 379/45 |
| 2007/0121801 A1 | 5/2007 | Montoya | |
| 2008/0240371 A1 | 10/2008 | Gray | |
| 2009/0003535 A1 | 1/2009 | Grabelsky et al. | |
| 2009/0067584 A1 | 3/2009 | Waters et al. | |
| 2009/0110154 A1 | 4/2009 | Colunga | |
| 2009/0168974 A1 | 7/2009 | McCormick | |
| 2009/0253399 A1 | 10/2009 | Snapp | |

(Continued)

Primary Examiner — Harry Hong

(57) ABSTRACT

A call control system comprising a control module, a translations database and a switching fabric are connected to a trunk group between a remote terminal and its controlling local switching office. The call control system monitors control signals from the switching office on the trunk. In the event of loss of control signals, the call control system intercepts requests for service, etc. from a calling telephone connected to the remote terminal and performs a look up in the translation database. If the call can be completed without the controlling switching office the call is looped back to the remote terminal. The translation database is maintained by a remote terminal OA&M interface that receives change orders from the local exchange carrier. The remote terminal OA&M interface forwards relevant changes to the call control system's translation database.

5 Claims, 8 Drawing Sheets

U.S. PATENT DOCUMENTS

| | | |
|---|---|---|
| 2009/0296899 A1 | 12/2009 | Beason et al. |
| 2009/0296900 A1 | 12/2009 | Breen et al. |
| 2010/0020942 A1 | 1/2010 | Olshansky et al. |
| 2010/0046489 A1 | 2/2010 | Dickinson et al. |
| 2010/0272242 A1 | 10/2010 | Croy et al. |
| 2011/0058658 A1 | 3/2011 | Li |
| 2011/0081010 A1 | 4/2011 | Mitchell |

\* cited by examiner

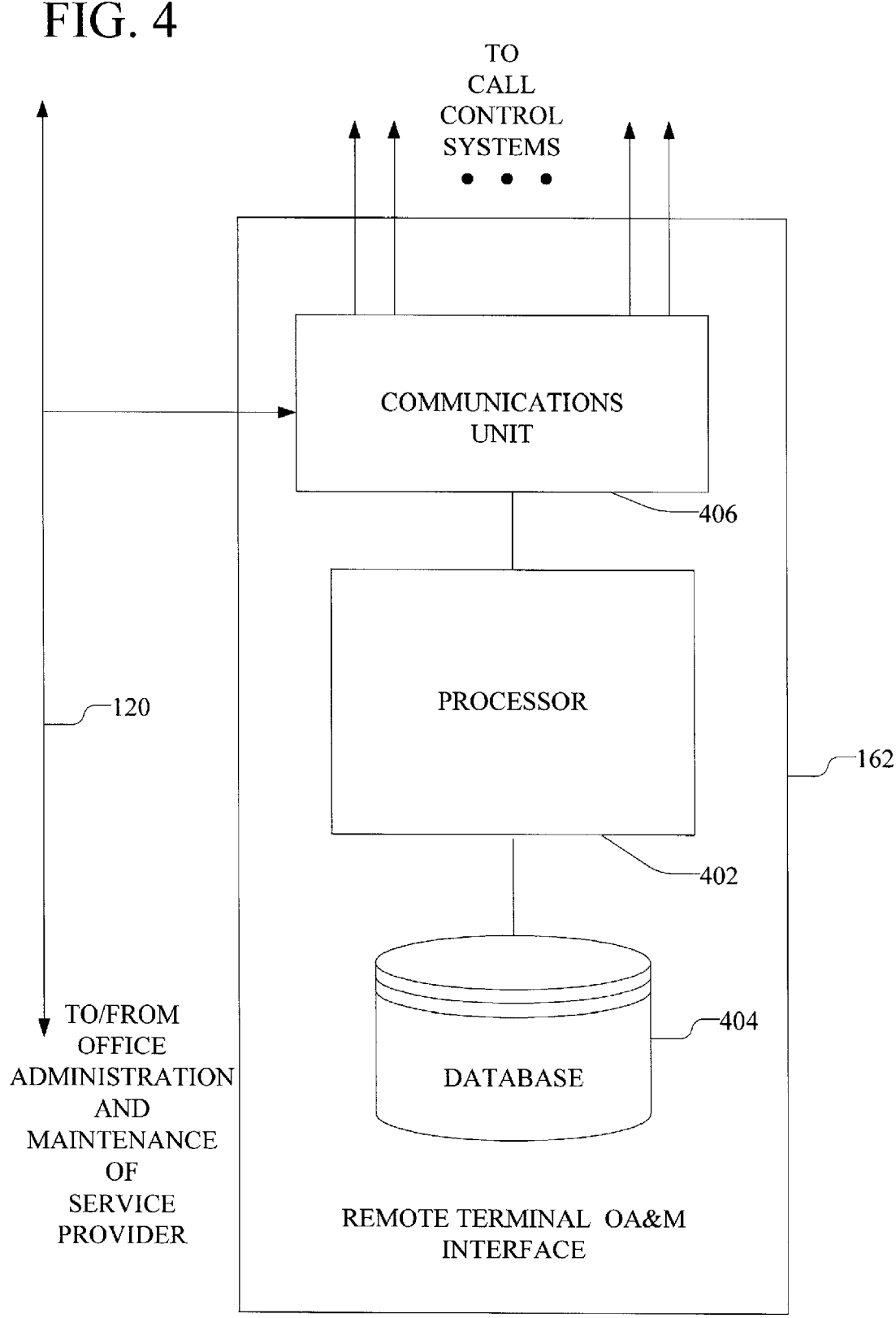

SYSTEM AND METHOD FOR MAINTAINING A TRANSLATIONS DATABASE TO EFFECT CALL CONTROL AT A REMOTE TERMINAL

CROSS REFERENCE TO RELATED APPLICATIONS

This application is related to and claims the benefit of the filing date of U.S. Provisional Patent Application Ser. No. 60/723,885 entitled "SYSTEM AND METHOD FOR FACILITATING EMERGENCY CALLING FROM A REMOTE TERMINAL," by Alex Montoya, which was filed on Oct. 5, 2005, and is also related to U.S. Patent Application entitled "SYSTEM AND METHOD FOR FACILITATING EMERGENCY CALLING FROM A REMOTE TERMINAL," by Alex Montoya and filed on even data with this patent application, both of which are incorporated by reference in their entirety.

BACKGROUND OF THE INVENTION

This invention relates to the field of remote terminals as used in wireline telephony, and, more specifically, to maintaining a translations database to effect call control in a remote terminal that routes telephone calls when communication between the remote terminal and its controlling switching system is lost.

Wireline telephone local exchange carriers use remote terminals (such as, but not limited to, subscriber loop carriers and digital loop carriers) to serve customer telephones that are too far from the nearest local switching office to provide acceptable service directly. A remote terminal is connected to a local switching office by one or more trunk groups, which provide voice paths and a control path between the local switching office and the remote terminal. The local switching office controls the remote terminal as if it were merely an extension of the switching office. There is no local controller or switch fabric in a remote terminal to save on cost, complexity and space. In this manner, subscribers that otherwise could not be served by conventional wireline telephony can be served by a remote terminal. Further, the telephone local exchange carrier does not have to build or buy expensive local switching offices or remote switching modules to serve only a few subscribers.

A problem in the art, however, is that control of the remote terminal is tightly coupled to the local switching office. Therefore, whenever the local switching office is out of service, or the umbilical trunk is cut, the remote terminal is out of service. When there is a problem the local switching office, the umbilical trunk, or both, there is no telephone service for the telephone customers served by the remote terminal, even though the problem may be many miles away. The remote terminal may be otherwise fully functional, but there is no control or switching fabric to perform the functions necessary to provide local service. While there are some suggestions in the art to add such switching capabilities to a remote terminal, none of these suggestions solve this problem without integrating equipment (such as processing units and switching fabrics) directly to the remote terminal. Such additional equipment amounts to replacing an inexpensive remote terminal with a relatively more expensive remote switching module (known in the art as a "forklift" replacement), which is what the service providers are trying to avoid.

Even given a system that can operate a remote terminal in stand-alone mode, the data used to route calls, kept in a database that is usually called a "translations database" must be kept synchronized with the data used by the controlling switching system for call routing. A translations database associates a line appearance or line ID with a telephone number. Further, the translations database associates emergency call routing information with the line ID for use when and emergency number, such as "9-1-1," is called. In most situations, manually updating records for each and every change of telephone number or emergency call routing information is prohibitively expensive, time consuming and not necessarily performed as quickly as the updates are applied at the remote terminal's controlling central office.

Thus, there is no low cost method to operate a remote terminal in a stand-alone mode that can be implemented without a forklift replacement and/or a reconfiguration of the wireline infrastructure and there is no low cost method to maintain a translations database in synchronization with translation data in a controlling switch.

SUMMARY OF THE INVENTION

This problem is solved and a technical advance is achieved in the art by a system and method effects call processing in a remote terminal when the control connection to its controlling local switching office is lost. A system in accordance with this invention comprises a control module, a translations database and a switching fabric. The switching fabric is connected to the trunk group between the remote terminal and the local switching office. Advantageously, there is a trunk interface unit interconnecting the switching fabric with the trunk group. Importantly, the translations database only maintains translations for its associated remote terminal and the switching fabric only has the capacity to switch calls from the trunk group. Thus, no modification of existing infrastructure, either in the local switching office or the remote terminal, is needed, except to add one box to the trunk group between the local switching office and the remote terminal.

In accordance with the method aspect of this invention, the controller monitors control signals on the trunk between the remote terminal and its controlling switching office. In the event of loss of communication on the trunk, the controller intercepts requests for service, etc. from a calling telephone connected to the remote terminal and performs a look up in the translation database. If the call can be completed without the controlling switching office (e.g., the call is for a telephone also connected to the remote terminal), the control module causes the switching fabric to loop the call back to the remote terminal and the causes the remote terminal to perform ringing and other such functions.

Importantly, the translation database is maintained by a remote terminal OA&M interface that receives the orders from the local exchange carrier as they are sent to the local switching office. Advantageously, change orders for several remote terminals may be received by the same remote terminal OA&M interface. The remote terminal OA&M interface forwards relevant changes to each translation database. Further, maintenance and updates to the controller itself may be made in the same fashion. In this manner, a low-cost system and method for effecting call processing in a remote terminal maintains telephone service on a remote terminal when the remote terminal is disconnected from its host switching system.

BRIEF DESCRIPTION OF THE DRAWINGS

A more complete understanding of this invention may be obtained from a consideration of this specification taken in conjunction with the drawings, in which:

FIG. 4 is a block diagram of a remote terminal OA&M interface in the context of a wireline telephone network;

DETAILED DESCRIPTION

Figure 1:
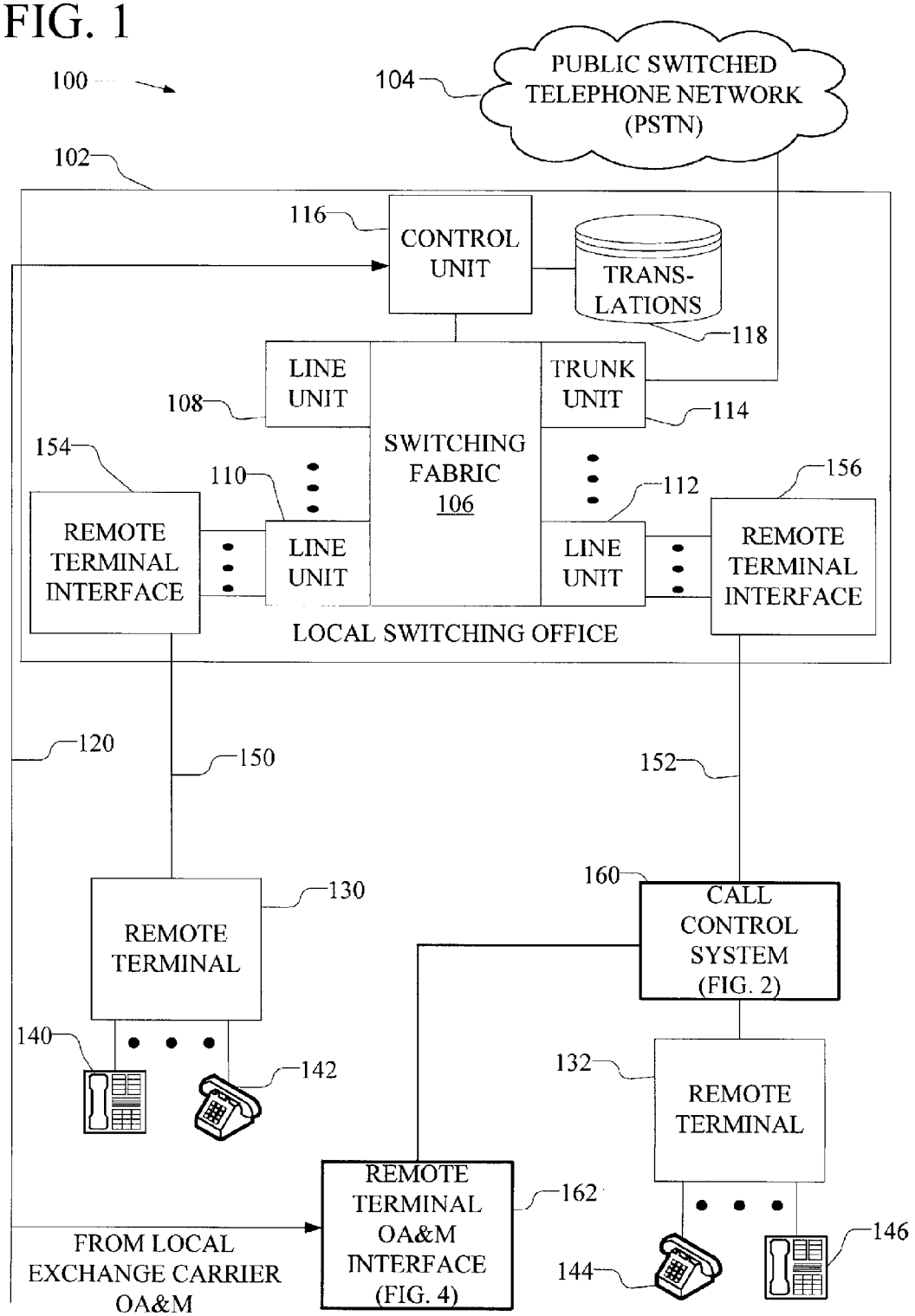
FIG. 1 is a block diagram of a wireline telephone system in which an exemplary embodiment of this invention is implemented.

FIG. 1 is a block diagram of a wireline telephone network 100 in which an exemplary embodiment of this invention operates. In the wireline telephone network 100 of FIG. 1, a local switching office 102 is connected to the public switched telephone network (PSTN) 104. This configuration is used herein for convenience and clarity in describing the invention; it is well known in the art that local switching office 102 is part of PSTN 104. Local switching office 102 comprises a switching fabric 106 that interconnects a plurality of line units, herein represented by line units 108, 110 and 112 and trunk units, herein represented by trunk unit 114. (Other units, such as global services units, etc., are not shown but are well known in the art and thus not described.) Switching fabric 106, line units 108, 110 and 112 and trunk unit 114 are all well known in the art, do not form part of the invention and thus are not further described.

A control unit 116 causes switching fabric 106 to connect a particular line (or member of a trunk group) to another based on information contained in translations database 118. Control unit 116 and translations database 118 are also well known in the art, form no part of this invention, and are thus not described further. Importantly, translations database 118 is kept current via a connection 120 to a centralized office administration and maintenance (OA&M) system (not shown but well known in the art). In this manner, the local exchange carrier can modify translations database 118 without having to enter each change manually at local switching office 102.

In order to provide service to customers who are beyond the range of wireline transmission, operating companies connect remote terminals, represented by remote terminal 130 and remote terminal 132, between local switching office 102 and a plurality of distant customer telephones, represented by telephones 140, 142, 144 and 146. In general, remote terminals 130 and 132 consolidate and concentrate signals to and from the distant customer telephones and connect the distant customer telephones to the local switching office 102 over transmission media 150, 152 (e.g., fiber optical cables) that do not have the same distance limitations as telephone lines. Transmission media 150, 152 generally comprise trunks (as known in the art) and are therefore referred to hereinafter as "trunks."

In local switching office 102, each trunk 150, 152 is connected to a remote terminal interface 154, 156 (respectively), that provides a line appearance for each telephone (e.g., telephones 140, 142, 144 and 146) at a respective line unit (illustrated herein as 110 and 112). Such remote terminals 150 and 152 and remote terminal interfaces 154 and 156 are known in the art as subscriber loop carriers ("SLC's") and digital loop carriers ("DLC's"), depending upon the transmission medium and the protocol used for supporting such systems. For example, GR-303 and TR08 are commonly used protocols for providing remote terminal service. While some remote terminals (especially older remote terminals) use proprietary protocols, it is within the ability of one skilled in the art to build a call control system in accordance with whatever protocol is used after studying this specification.

As is standard in the art, control unit 116 of local switching office 102 controls all remote terminals (herein 130 and 132). Thus, when a telephone (such as telephone 142) goes off-hook, remote terminal 130 detects the off-hook condition and reports the off-hook condition to remote terminal interface 154. Remote terminal interface 154 forwards the information to control unit 116. Control unit 116 causes line unit 110 to provide dial tone through remote terminal interface 154, trunk 150 and remote terminal 130 to telephone 142. Telephone 142 then sends dual-tone, multifrequency signals (or dial pulses) back to control unit 116, which decodes the signals into digits and performs a look-up in translations database to determine how to handle the call.

In the illustrative embodiment of FIG. 1, local switching office 102 supports two remote terminals 130 and 132. Remote terminal 130 is connected directly to local switching office 102. Because all control of remote terminal 130 is provided by control unit 116 of local switch office 102, no service is or can be provided to telephones 140 and 142 when service is interrupted anywhere between remote terminal 130 and local switching office 102. Such service interruptions include, but are not limited to, breaks in trunk 150, remote terminal interface 154 problems, a problem with control unit 116 or an outage of the entire local switching office 102.

In accordance with this invention, a call control system 160 (illustrated herein in heavy block line and described in more detail in connection with FIG. 2) is connected across trunk 152 between remote terminal 132 and remote terminal interface 156. In accordance with this exemplary embodiment of this invention, call control system 160 monitors trunk 152 for control signals between control unit 116 and remote terminal 132. When such signals are not present on trunk 152 (for whatever reason) call control system 160 takes over control of remote terminal 132 so that calls may be completed (at least) between telephones connected to remote terminal 132. Additionally, call control system 160 can perform other functions in conjunction with local switching office 102 when local switching office 102 and remote terminal 132 are fully operational. For example, call control system 160 may expedite special number calls (described further, below, in connection with FIGS. 6 and 7).

Call control system 160, as will be described further, below, in connection with FIG. 2, includes a controller and a translation database containing information regarding remote terminal 132, and its connected telephones (e.g., telephone 144 and telephone 146). As is known in the art, translation database 118 of local switching office 102 is updated regularly (to add, delete or change telephone numbers and line ID's, for example). In order to keep translation database of call control system 160 synchronized with translation database 118 of local switching office 102, call control system 160 is connected to a remote terminal OA&M interface 162 (shown in heavy block line) that monitors OA&M channel 120 for changes affecting remote terminal 132. Advantageously, remote terminal OA&M interface 162 monitors OA&M channel 120 for a plurality of switch proxies (not shown).

In this manner, some basic services that formerly were not available when remote terminal 132 is isolated from local switching office 102 are now available. For illustration purposes, assume that remote terminal 132 provides service to a rural community several miles from local switching office 102. Further, assume that telephone 146 is a telephone at a local public safety provider, such as (but not limited to) a local fire department or county sheriff's office. In the prior art, a caller at telephone 144 could not contact telephone 146 in an emergency, even though both telephones are in the same community, because of a problem or an outage that occurs miles away. In accordance with this invention, call control system 160 takes over during an outage and provides at least limited local service. Thus, telephone 144 can be connected to telephone 146 in accordance with this invention, even when local switching office 102 cannot provide service.

Figure 2:
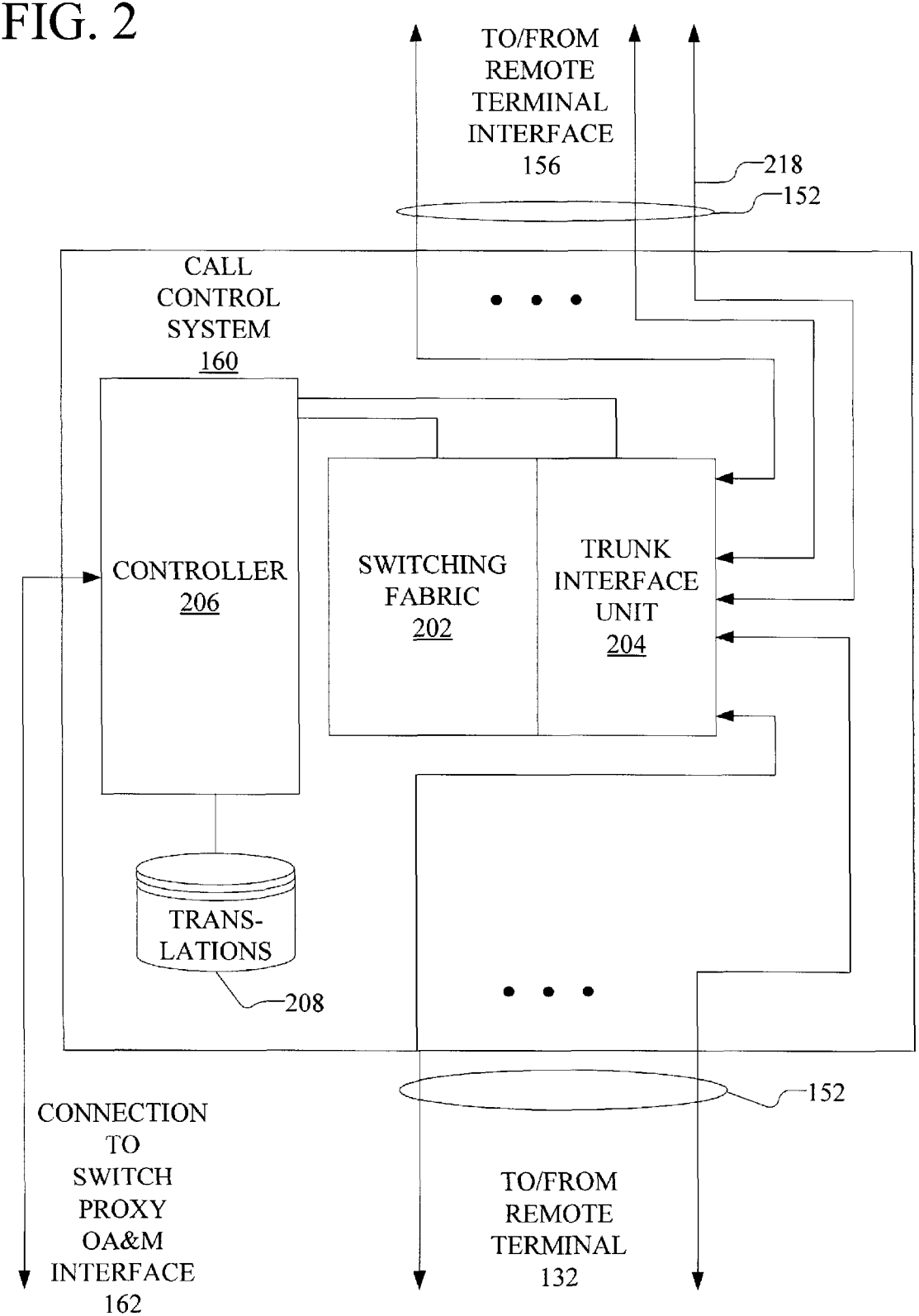
FIG. 2 is a block diagram of an exemplary embodiment of the call control system of FIG. 1.

Turning now to FIG. 2, a block diagram of a call control system 160 in accordance with aspects of this invention is illustrated. In general, call control system 160 comprises a switching fabric 202 interconnected with a trunk interface unit 204. In this exemplary embodiment, switching fabric 202 comprises a time slot interchange unit. One skilled in the art will appreciate that other types of switching fabrics may be employed depending upon the type of trunks or transmission media connected thereto.

Continuing with this exemplary embodiment of this invention, trunk interface unit 204 is connected to remote terminal 132. Controller 206 receives signals from telephones connected to remote terminal 132 via trunk interface unit 204, switching fabric 202 or both, interprets the signals and causes switch fabric 202 to connect one telephone to another. Controller 206 uses data stored in translation database 208 to provide such connections. As stated above, the data in translation database 208 is synchronized to translation database 118 regarding telephones connected to remote terminal 132. Such synchronicity is provided by the remote terminal OA&M system (which will be described herein, below, in connection with FIG. 4).

Transmission medium 152 is also connected to trunk interface unit 204 on the remote terminal interface 156 side of call control system 160. Trunk interface unit 204 monitors trunk 152 for control signals from local switching office 102. When no signals are detected, then trunk interface unit 204 notifies controller 206. In response, controller 206 begins to supervise lines from remote terminal 132. When control signals are present on trunk 152, then communications circuits are merely connected through switching fabric 202 and back out trunk interface unit 204 (known in the art as "hairpinning"). Such hairpins comprise permanent (or semi-permanent) connections through switching fabric 202 (also called "nailed up"). In this exemplary embodiment, wherein switching fabric 202 comprises a time slot interchange unit, predetermined time slots are reserved for such nailed up connections. Thus, the call control system 160, in accordance with this embodiment of the invention, is generally transparent to call control during normal operations (i.e., remote terminal 132 is controlled by local switching office 102).

In accordance with one specific embodiment of this invention, one (or more) member 218 of trunk 152 is reserved for special number calls. As will be described further, below, call control system 160 may use these facilities to connect such special number calls directly, thus by-passing control of these outbound calls by local switching office 102. Such special number calls include, but are not limited to, emergency number calls ("9-1-1").

Figure 3A:
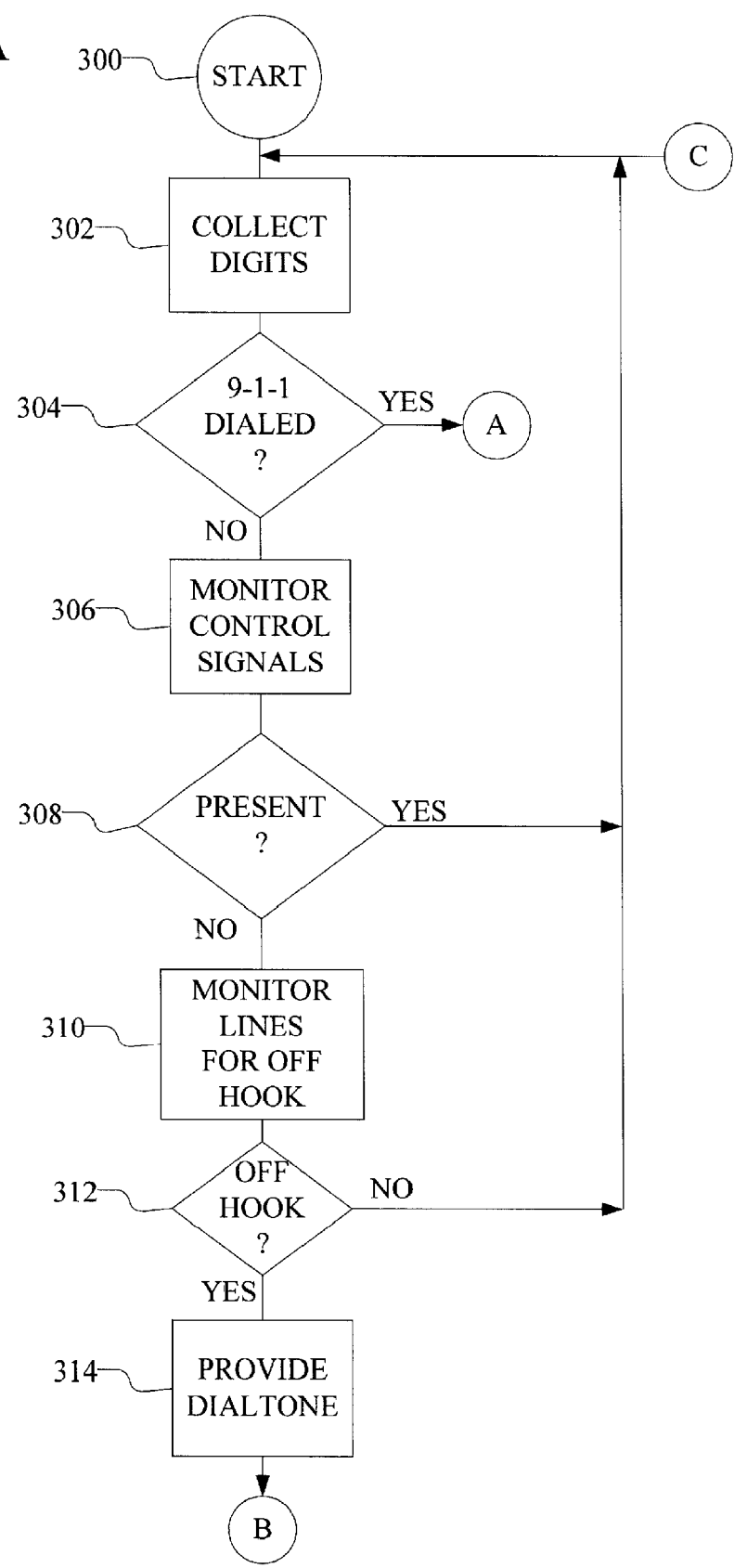
FIGS. 3A and 3B are flow charts illustrating the operation of the call control system shown in FIGS. 1 and 2.
Figure 3B:
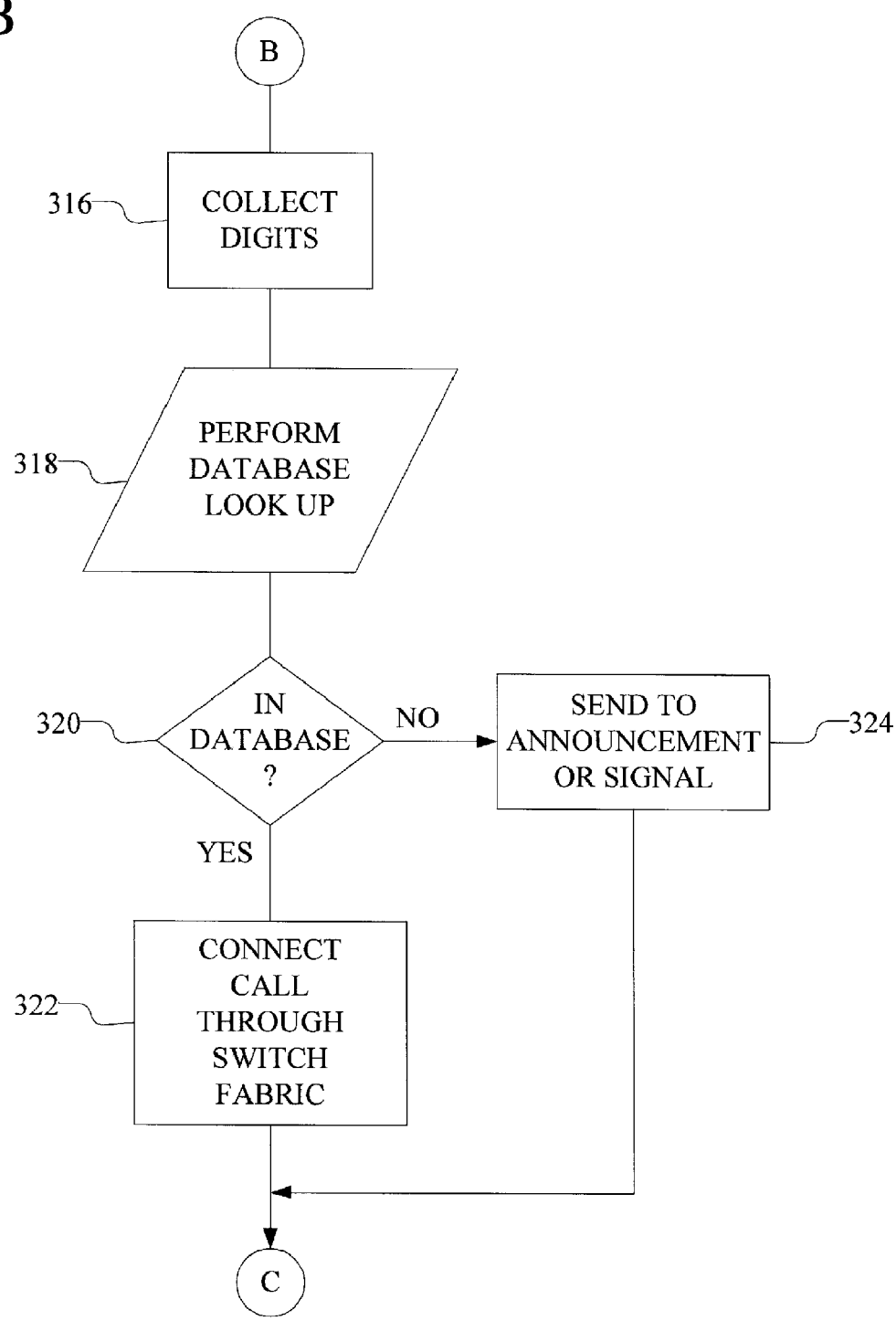

The flow of operations of controller 206 will now be illustrated in FIGS. 3A and 3B taken in connection with FIG. 2. Operation is described herein in terms of supervising lines for off hook. One skilled in the art will appreciate how to provide other telephony services after studying this specification.

Operation starts at circle 300 of FIG. 3A, and moves to operation box 302, where trunk interface unit 204 monitors all individual trunks for a predefined outbound call, which, in this exemplary embodiment, comprises the digit string "9-1-1." Such monitoring may be accomplished by intercepting all digit signals. When an initial "9" is dialed the line is monitored for more digits. If the "9" is not followed by "1-1," then all intercepted digits are forwarded to the remote terminal interface. One skilled in the art will be able to build a call control system that monitors for and intercepts calls to special numbers in accordance with this invention after reviewing this specification.

If 9-1-1 (or other special number) is dialed, as determined in decision diamond 304, then processing proceeds through connector A to FIG. 7 (which is described further, below). If 9-1-1 was not dialed, then processing continues to operation box 306, where trunk interface unit 204 monitors trunk 152 for control signals. Processing proceeds to decision diamond 308, where a determination is made whether control signals are present on transmission medium 152. If control signals are present, processing loops back to operation box 302.

If, in decision diamond 308, a determination is made that control signals are not present, then processing proceeds to operation box 310, where controller 206 monitors trunk interface unit 204 for off hook condition on any of the supported telephones (e.g., telephones 144 and 146). Processing continues to decision diamond 312, where a determination is made whether an off hook condition is detected. If off hook is not detected, then processing loops back to operation box 302.

If, in decision diamond 312, a determination is made that an off hook condition is present, then processing proceeds to operation box 314, where controller 206 causes dialtone to be provided. Processing continues through connector B to FIG. 3B.

Turning now to FIG. 3B, processing starts at connector B and proceeds to operation box 316, wherein the off hook line is monitored for digit signals. Next, call control system 160 performs a database lookup in operation box 318. In this step, controller 206 of call control system 160 uses the collected digits as a key into translation database 208. A determination is made in decision diamond 320 whether the call can be completed as dialed. In this exemplary embodiment, only calls to lines connected to remote terminal 132 may be completed. Therefore, if the call is to a number not in translation database 208, then the call is sent to announcement or signal in box 324. If the call can be completed as determined in decision diamond 316, then the call is connected through switch fabric in box 322. In an exemplary embodiment wherein 9-1-1 were the dialed digits (when the call control system and remote terminal are in stand-alone mode), there may be a calling "tree" as is known in the art, so that the call is completed. Processing loops back to FIG. 3A via connector C.

While this invention is described in terms of wireline (circuit-switched) telephony, the principles of this invention may be applied to other forms of telephony. For example, a call control system may control a remote terminal that supports voice over Internet protocol (better known simply as "VoIP"). Instead of monitoring lines for signals, the call control system monitors data packets for control content. It is within the ability of one skilled in the art to modify this invention to support other types of telephony after studying this specification.

FIG. 4 is a block diagram of a remote terminal OA&M interface 162 in accordance with another aspect of this invention. Remote terminal OA&M interface 162 generally comprises a processor 402, a database 404 and a communications unit (or units) 406. At least one record is kept for each call control system in database 404, wherein translations for each line served by a call control system (such as lines 144 and 146) is maintained.

Figure 5:
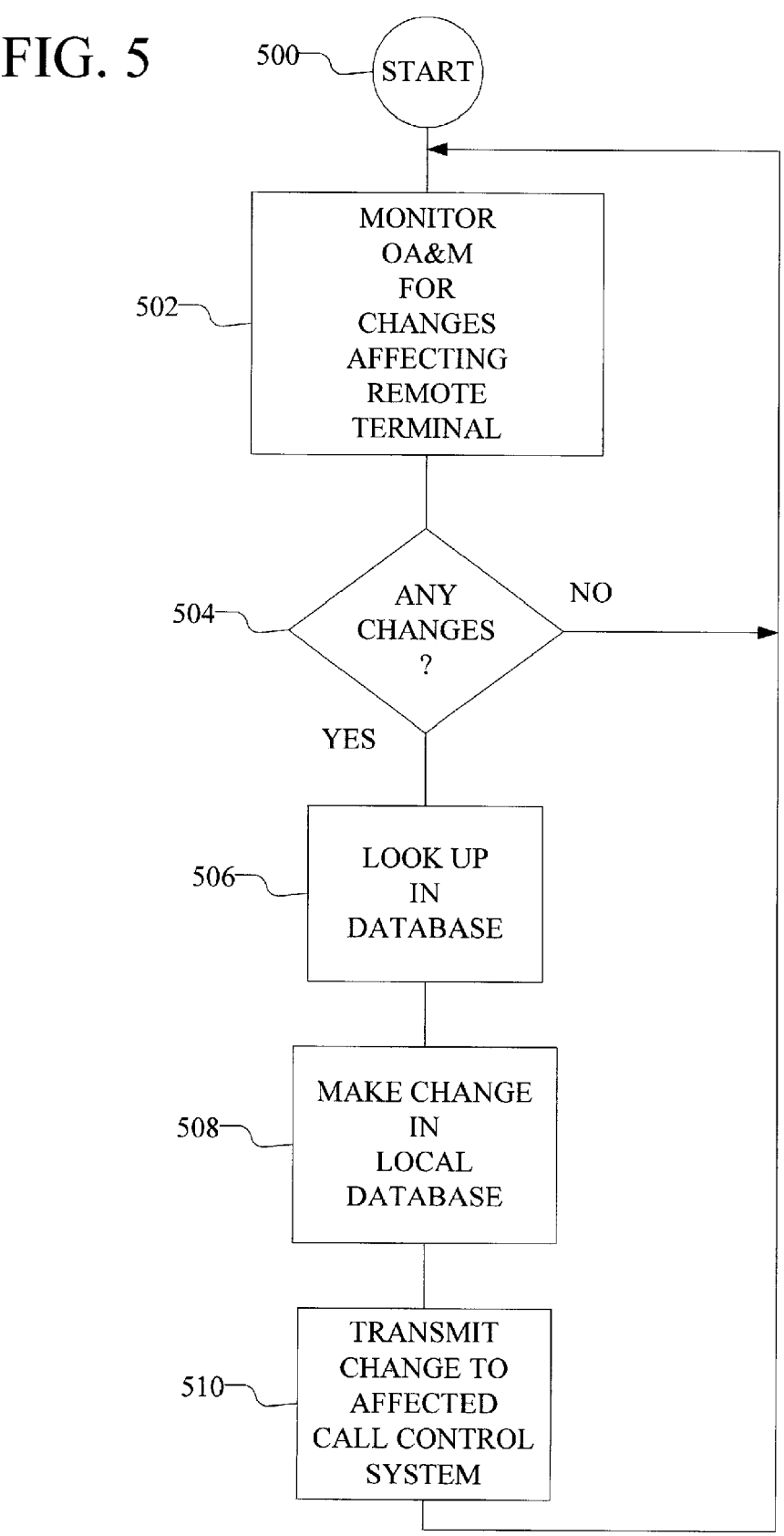
FIG. 5 is a flow chart illustrating the operation of the remote terminal OA&M interface of FIG. 4.

The operation of remote terminal OA&M interface 162 will now be described in the context of the flow chart of FIG. 5 taken in conjunction with the block diagram of FIG. 4. Processing starts in circle 500. In box 502, communications unit 406 monitors OA&M channel 120 and passes data received to processor 402. Processor 402 determines whether the OA&M data affects any line served by a call control system by comparing the data received to data in database 404 in decision diamond 504. If no change affecting any call control system is detected, then processing loops back to box 502 and the change is ignored.

If, in decision diamond 504, a change affecting one or more lines served by a call control system in accordance with this invention is detected, then a database lookup is performed on the affected line or lines in box 506. Changes are recorded in database 404 in box 508. Finally, all changes are transmitted to the affected call control system via communications unit 406. The changes may be transmitted when received or may be transmitted as a batch job during non-peak times.

While this exemplary embodiment is described in terms of a direct connection between remote terminal OA&M interface 162 and one or more switch proxies, one skilled in the art will realize that there are many ways to provide this interconnection. For example, remote terminal OA&M interface 162 may be connected to the call control system's local switching office. In this scenario, the remote terminal OA&M interface uploads changes for a call control system to the local switching office. At some convenient time, the call control system places a telephone call to the local switching office and downloads the changes. Alternatively, the local switching office may periodically download changes to the call control system on an unused trunk, on a dedicated trunk or on the control channel. Finally, the call control system may periodically call a special telephone number associated with remote terminal OA&M interface to obtain any updates.

Figure 6:
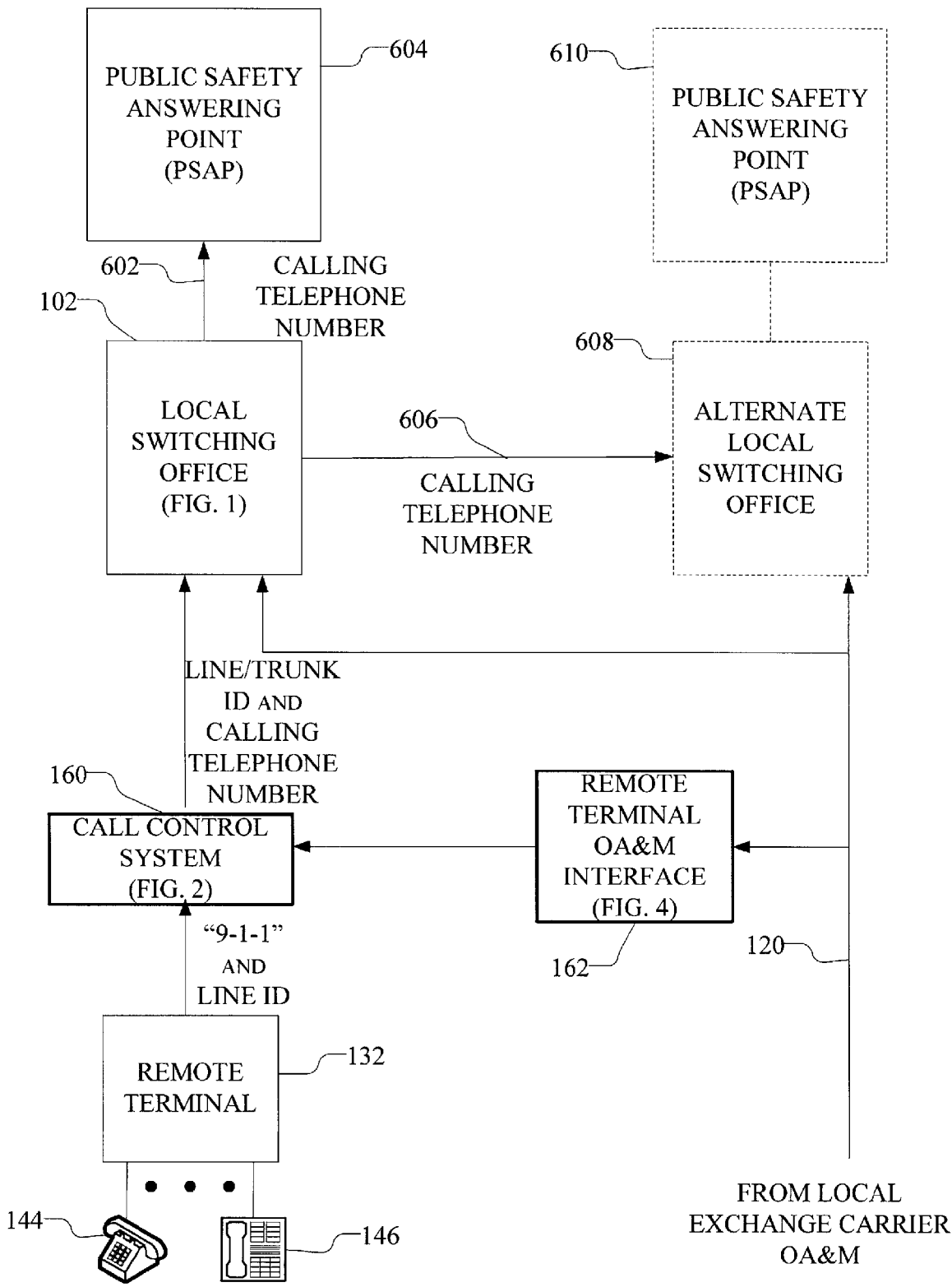
FIG. 6 is another view of the wireline telephone system of FIG. 1 in which another exemplary embodiment of this invention is implemented.

Turning now to FIG. 6, another view of the wireline telephone system of FIG. 1 is shown, in which another embodiment of the present invention operates. In this exemplary embodiment, call control system 160 operates on calls to special numbers, such as 9-1-1, in order to expedite call processing through PSTN 112. Call processing in relation to 9-1-1 is herein described to illustrate the embodiment and advantages of the invention. One skilled in the art will realize how to expedite call processing to any number, regardless of number of digits, after studying this specification. For example, calls to "0" may be routed specially to designated operator centers. Calls to "0-1-1" may be specially routed to international switching gateways. Further, one skilled in the art will realize that the database includes not only the usual destination, but also alternative destinations. For example, the database includes both the destination PSAP routing information and one or more alternate destinations in case the primary is unavailable. Thus, the call control system routes calls to an alternate number (e.g., the local fire or sheriffs department) if the remote terminal is in isolation.

In this exemplary embodiment of PSTN 112, local switching office 102 is connected via lines, trunks, or both lines and trunks (singularly or collectively labeled 602) to public safety answering point (PSAP) 604. Alternatively, local switching office may be connected via trunk 606 to alternate local switching office 608 (shown in phantom). Alternate local switching office 608 is connected to alternate PSAP 610 (also shown in phantom). Alternate PSAP 610 may be the designated PSAP to serve either or both telephones 144 and 146 or may be an alternate in case PSAP 604 cannot handle a call.

Figure 7:
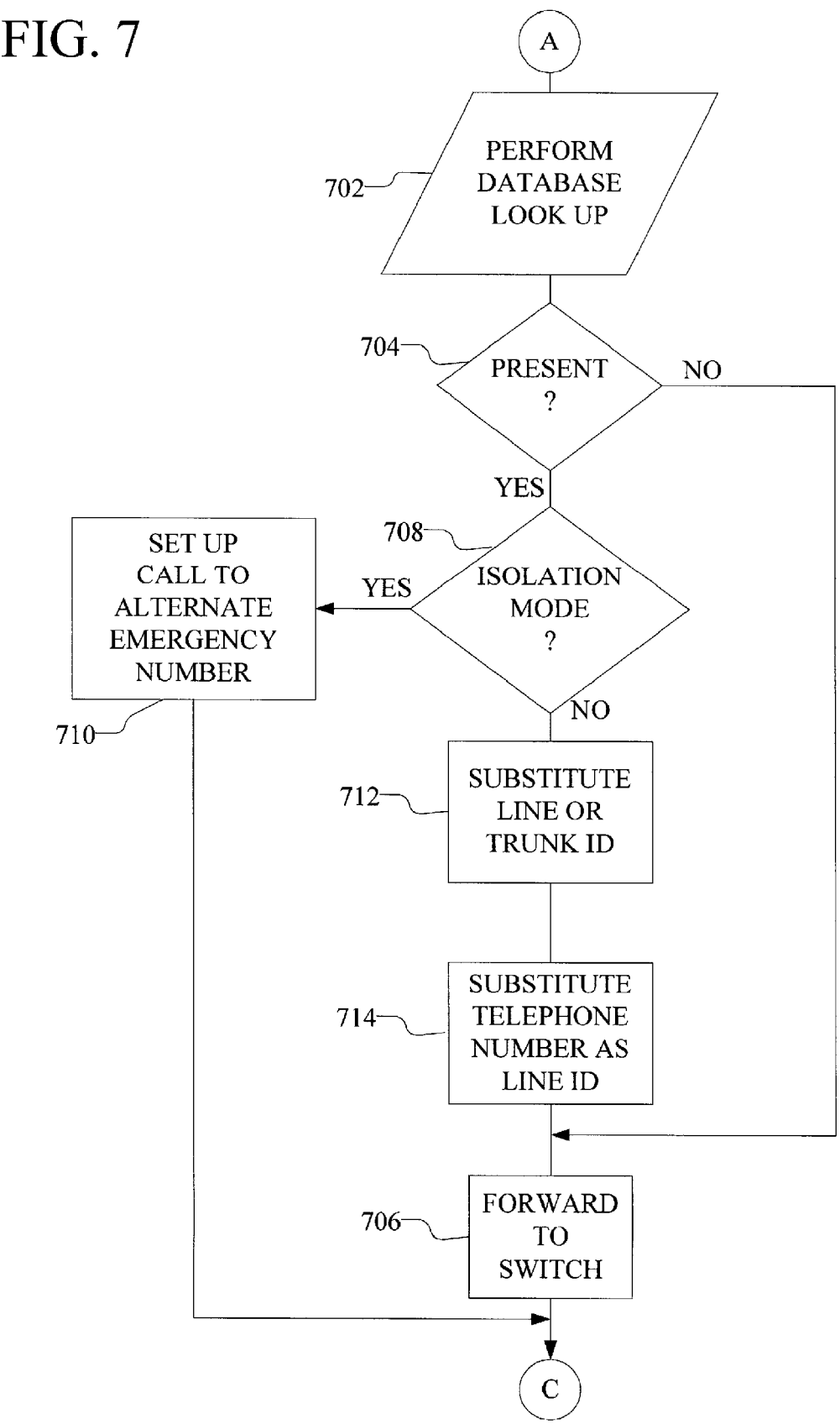
FIG. 7 is a flow chart illustrating the operation of the call control system of FIGS. 1, 2 and 6 for expediting special number calls in the wireline telephone system of FIG. 6.

Call processing is now described in the flow chart of FIG. 7 taken in conjunction with FIG. 6 As described above in connection with FIG. 3A, call control system 160 monitors remote terminal 132 for calls to 9-1-1. For purposes of this exemplary embodiment, the user of telephone 144 dials 9-1-1. The digits and the line ID are intercepted by call control system 160 (decision diamond 304, "yes" branch, connector A, FIG. 3A).

Processing begins in connector A and moves to database look up in 702. Call control system 160 performs a look up in its database for the line ID of telephone 144 to determine its designated public safety answering point (PSAP) and any (all) backup numbers. In general, a line ID or trunk ID is determined for the PSAP that serves the jurisdiction of the calling line ID and any line ID of backup public safety telephones connected to remote terminal 132. The telephone number of telephone 144 is retrieved from the database.

In decision diamond 704, a determination is made whether the line ID of the calling telephone is present in the database. If the line ID is not present, then the call is forwarded to the switch 706 and call processing returns to the monitor state, through connector C. If the line ID of the calling telephone is present, as determined in decision diamond 704, then a determination is made whether remote terminal 132 is isolated from its local switching office 102. If the remote terminal is isolated, then the call cannot be completed in the normal fashion to the serving PSAP. Therefore, in box 710, a call is set up to one (or more) lines connected to remote terminal 132. Call processing returns to the monitoring function through connector C.

If remote terminal 132 is not isolated, then, in box 712, call control system 160 substitutes the line or trunk ID, and in box 714, substitutes the telephone number of telephone 144 as the line ID. The call is then forwarded to local switching office 102 in box 714. Processing ends at connector C, which connects back to the monitoring functions described in FIGS. 3A and 3B.

Continuing with FIG. 6, local switching office 102 receives line or trunk ID and the calling telephone number from call control system 160. To local switching office 102, this call pair (routing ID and calling numbers) appears to be a line-to-line, line-to-trunk, trunk-to-line, or trunk-to-trunk call. The call is immediately forwarded on trunk 602 to PSAP 604. In The alternate exemplary embodiment, the call is delivered to alternate local switching office 608 via trunk 606, which then delivers the call to PSAP 610.

The above-described exemplary embodiment of this invention saves call-processing time and thus expedites calls that need to be expedited. In the prior art, local switching office 102 performs digit collection, digit analysis and the database look up based on calling line ID for all calls from its connected remote terminals 130, 132. Then local switching office 102 delivers the call to a selective router based on the database look up. Such actions are performed as a matter of routine, regardless of the nature of the call.

In direct contradistinction, this invention directly scans for special numbers (9-1-1 in the above exemplary embodiment), and takes action immediately. Local switching office 102 is effectively by-passed, thus saving time. It has been determined that, if a 9-1-1 call is not answered within 10 seconds, the attempt is abandoned and another attempt is made. By moving call routing for such service closer to the origin, and thus simplifying call routing through the PSTN, the call will by completed more rapidly than in the prior art.

In order to keep the records for such special calls synchronized with local switching office 102, remote terminal OA&M interface 162 monitors OA&M update channel 120. Any changes to local switching office 102 alternate local switching office that affects any telephone lines connected to remote terminal 132 and served by call control system 160 are forwarded to call control system 160.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

The invention claimed is:

1. A remote terminal office administration and maintenance (OA&M) system for maintaining a call control translations database at a call control system synchronized with a local switching office translations database comprising:
   a communications interface coupled with an OA&M line to the local switching office and configured to monitor received OA&M data on the OA&M line and coupled to communicate with the call control system;
   a database configured to keep stored OA&M data regarding each line served by the call control system; and
   a controller coupled with the communications interface and with the database and configured to receive the received OA&M data from the communications interface and compare the received OA&M data with the stored OA&M data the controller and the database cooperating to save changes in the stored OA&M data regarding each line served by the call control system in the database as the received OA&M data is delivered to the local switching office.

2. A remote terminal OA&M system in accordance with claim 1 wherein the communications interface is configured to monitor received OA&M data on a plurality of OA&M lines.

3. A remote terminal OA&M system in accordance with claim 1 wherein the communications interface is configured to communication with a plurality of switch proxies.

4. A remote terminal OA&M system in accordance with claim 1 wherein the database is configured to save the stored OA&M data regarding each line served by a plurality of switch proxies.

5. A remote terminal OA&M system in accordance with claim 1 wherein the communications interface comprises a first communications interface configured to monitor received OA&M data on the OA&M line and a second communications interface configured to communication with one or more call control systems.

* * * * *